US010699577B2

(12) United States Patent
Winzell et al.

(10) Patent No.: US 10,699,577 B2
(45) Date of Patent: Jun. 30, 2020

(54) METHOD FOR CONVERTING ALERTS (71) Applicant: Axis AB, Lund (SE)

(72) Inventors: Thomas Winzell, Lund (SE); Anthony Hawkins, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/567,775

(22) Filed: Sep. 11, 2019

(65) Prior Publication Data

US 2020/0098268 A1 Mar. 26, 2020

(30) Foreign Application Priority Data

Sep. 26, 2018 (EP) ..................................... 18196854

(51) Int. Cl.
*G08G 1/16* (2006.01)
*G06T 7/70* (2017.01)
*G06K 9/00* (2006.01)
*H04N 5/33* (2006.01)

(52) U.S. Cl.
CPC ......... *G08G 1/165* (2013.01); *G06K 9/00624* (2013.01); *G06T 7/70* (2017.01); *H04N 5/33* (2013.01); *G06T 2207/10016* (2013.01); *G06T 2207/10048* (2013.01)

(58) Field of Classification Search
None
See application file for complete search history.

(56) References Cited

U.S. PATENT DOCUMENTS

| 6,985,073 | B1* | 1/2006 | Doan ..................... B60Q 1/525 340/425.5 |
| 6,999,004 | B2* | 2/2006 | Comaniciu .......... G06K 9/3241 340/937 |
| 8,466,962 | B2* | 6/2013 | Hutchison ............. G08G 1/095 348/143 |
| 10,235,877 | B1* | 3/2019 | Ellis ...................... G01S 13/867 |
| 10,576,986 | B2* | 3/2020 | Nishi .................. B60W 40/068 |
| 2002/0113875 | A1* | 8/2002 | Mazzilli ................... B60R 1/12 348/148 |
| 2007/0222638 | A1* | 9/2007 | Chen ..................... G08G 1/095 340/901 |

(Continued)

FOREIGN PATENT DOCUMENTS

| JP | 11-174161 A | 7/1999 |
| JP | 2011-090513 A | 5/2011 |

(Continued)

OTHER PUBLICATIONS

Extended European Search Report dated Mar. 15, 2019 for the European Patent Application No. 18196854.6.

*Primary Examiner* — Jefferey F Harold
*Assistant Examiner* — Mustafizur Rahman
(74) *Attorney, Agent, or Firm* — Volpe and Koenig, P.C.

(57) ABSTRACT

A method and an alert discriminator for converting alerts in a video monitoring operation. The method comprises: triggering a candidate alert, in response to detecting, in a stream of thermal images of a scene, a stationary foreground object in the scene; evaluating an intensity of the detected stationary foreground object in relation to a background intensity; and in response to the intensity of the detected stationary foreground object being above the background intensity, converting the candidate alert to an actual alert.

13 Claims, 5 Drawing Sheets

(56) References Cited

U.S. PATENT DOCUMENTS

| | | | |
|---|---|---|---|
| 2009/0256911 A1* | 10/2009 | Hakki | G08G 1/0175 348/149 |
| 2010/0157061 A1* | 6/2010 | Katsman | G07C 5/008 348/149 |
| 2011/0050461 A1* | 3/2011 | Pixley | G08G 1/0104 340/933 |
| 2011/0080303 A1* | 4/2011 | Goldberg | G08G 1/07 340/909 |
| 2011/0228265 A1 | 9/2011 | Durickovic et al. | |
| 2012/0224063 A1* | 9/2012 | Terre | G08B 13/19643 348/148 |
| 2013/0241730 A1 | 9/2013 | Saitwal et al. | |
| 2014/0071286 A1* | 3/2014 | Bernal | G06T 7/246 348/149 |
| 2014/0085480 A1* | 3/2014 | Saptharishi | G06F 16/71 348/159 |
| 2014/0211988 A1 | 7/2014 | Fan et al. | |
| 2014/0320637 A1* | 10/2014 | Yi | B60R 1/00 348/118 |
| 2014/0333771 A1* | 11/2014 | Mian | B61L 23/00 348/149 |
| 2015/0139484 A1* | 5/2015 | Wu | G06K 9/00624 382/103 |
| 2016/0178593 A1 | 6/2016 | Miller et al. | |
| 2016/0272113 A1* | 9/2016 | Lopez-Hinojosa | B60W 50/14 |
| 2017/0240110 A1* | 8/2017 | Lopez-Hinojosa | H04W 76/10 |
| 2018/0013985 A1* | 1/2018 | Lee | H04N 1/4486 |

FOREIGN PATENT DOCUMENTS

| | | |
|---|---|---|
| WO | 2009/031083 A1 | 3/2009 |
| WO | 2016/197079 A1 | 12/2016 |
| WO | 2018/002925 A1 | 1/2018 |

\* cited by examiner

METHOD FOR CONVERTING ALERTS

FIELD OF INVENTION

The present teachings relate to a method for converting alerts in a video monitoring operation, and an alert discriminator configured to convert alerts in a video monitoring operation.

BACKGROUND

Thermal cameras are widely used for many different applications. For instance, thermal cameras can be used for automatic detection and recognition in video monitoring, where video monitoring of traffic is becoming an increasingly important application. Such systems monitoring traffic are typically capable of automatic alert triggering when detecting certain events, such as accidents, fires, vehicles, humans, or dropped cargo to name a few. These alert triggers are typically implemented in several ways, and it is of interest to reduce the number of false alerts.

A difficult false alert to handle is snow falling from vehicles inside a traffic tunnel. Such event is typically identified wrongly as, for example, dropped cargo or a stopped vehicle. An operator must then inspect these false alerts, and in case there is a large number of false alerts, actual alerts become less noticeable to the operator. Therefore, false alerts are a source of increased costs, as well as a safety risk.

Thus, there is a need to reduce the number of false alerts related to snow falling from vehicles.

SUMMARY

In view of the above, it is an object of the present teachings to provide a method and an alert discriminator for converting alerts in a video monitoring operation.

It is an object to mitigate, alleviate or eliminate one or more of the above-identified deficiencies in the art and disadvantages singly or in any combination and solve at least the above mentioned problem.

According to a first aspect, the above and other objects are achieved by a method for converting alerts in a video monitoring operation. The method comprises: triggering a candidate alert, in response to detecting, in a stream of thermal images of a scene, a foreground stationary object in the scene; evaluating an intensity of the detected stationary foreground object in relation to a background intensity; and in response to the intensity of the detected stationary foreground object being above the background intensity, converting the candidate alert to an actual alert.

By means of the present method it is possible to convert a candidate alert to an actual alert, by determining that the candidate alert is not related to snow. It may further be possible to reduce the amount of false alarms, since the conversion of candidate alerts to actual alerts is based on the intensity of the detected stationary foreground object.

The wording "candidate alert" should be construed as a temporary alert that may be converted to an actual alert or a discarded alert.

The wording "thermal image" should be construed as an image representing amounts of infrared energy emitted by an object.

The wording "stationary foreground object" should be construed as an object which has recently entered the scene, such that there is an observable difference from a background, and is static or stationary in a given range of time. Thus, a moving object is not a stationary foreground object within the context of this application.

The wording "actual alert" should be construed as an alert that is relayed to an operator.

A skilled person realizes that intensity in a thermal image may relate to temperature. For example, the intensity of the detected stationary foreground object may relate to a temperature of the detected stationary foreground object, and the background intensity may relate to a background temperature.

According to the present method, a candidate alert is triggered in response to detecting, in a stream of thermal images of a scene, a foreground stationary object in the scene. The stationary foreground object in the scene may be detected using an object-detection function. The object-detection function may be software implemented and/or hardware implemented.

An advantage of triggering a candidate alert is that additional information regarding the stationary detected foreground object may be evaluated prior to converting the candidate alert to an actual alert or a discarded alert.

According to the present method, an intensity of the detected stationary foreground object is evaluated in relation to a background intensity. The intensity of the detected stationary foreground object may be determined in a plurality of different manners. For example, the intensity of the detected stationary foreground object may be based on a weighted average or a weighted median of intensities of pixels in an area of the image comprising the detected stationary foreground object. The intensity of the detected stationary foreground object may be based on a peak intensity of pixels in the area of the image comprising the detected stationary foreground object. The intensity of the detected stationary foreground object may be related to a temperature of the detected stationary foreground object. The background intensity may be related to a temperature of the background. Thus, the temperature of the detected stationary foreground object may be evaluated in relation to the background temperature prior to converting the candidate alert to an actual alert or a discarded alert.

An advantage of evaluating the intensity of the detected stationary foreground object in relation to the background intensity is that the detected stationary foreground object may be separated from the background based on its intensity.

According to the present method, the candidate alert is converted to an actual alert in response to the intensity of the detected stationary foreground object being above the background intensity. Thus, the candidate alert is converted to an actual alert if the intensity of the detected stationary foreground object is higher than the background intensity. The actual alert may be transmitted or relayed to an operator. The operator may be a person operating a monitoring system. It is to be understood that the actual alert may be handled in other alert systems prior to being transmitted to the operator. For instance, the actual alert may be sorted according to a priority of to the actual alert.

An advantage of converting the candidate alert to an actual alert in response to the intensity of the detected stationary foreground object being above the background intensity is that the detected stationary foreground object may be that a stationary foreground object in need of operator action has been detected by the present method. For instance, the detected stationary foreground object may be a stopped vehicle, which must be removed from a traffic tunnel.

The method may further comprise: in response to the intensity of the detected stationary foreground object being equal to or lower than the background intensity, calculating a measure of disorder in intensity in pixels pertaining to an area of the scene comprising the detected stationary foreground object; and in response to the measure of disorder being above a disorder threshold, converting the candidate alert to a discarded alert.

The wording "pixels" should be construed as pixels in the thermal image, and not as pixels in the image detector.

The wording "discarded alert" should be construed as an alert that is not transmitted or relayed to the operator. Thus, the alert is, or should be, discarded.

According to the present method, a measure of disorder in intensity in pixels pertaining to an area of the scene comprising the detected stationary foreground object is calculated in response to the intensity of the detected stationary foreground object being equal to or lower than the background intensity.

As described above, the intensity of the detected stationary foreground object and the background intensity may be related to temperature. In such case, a measure of disorder in temperature in pixels pertaining to an area of the scene comprising the detected stationary foreground object may be calculated in response to the temperature of the detected stationary foreground object being equal to or lower than the background temperature.

The measure of disorder in intensity in pixels may be related to the degree of variation in intensity in pixels. Therefore, in case the intensity is related to temperature, the measure of disorder may be a measure of disorder in temperature. The measure of disorder in temperature in pixels may be related to variation in temperature in pixels.

For example, if the detected stationary foreground object is scattered, the pixels pertaining to the area of the scene comprising the detected stationary foreground object may have intensities relating to both the background intensity and the intensity of the detected stationary foreground object. Thus, the variation in the pixels pertaining to the area of the scene comprising a scattered detected stationary foreground object may be higher than if the detected stationary foreground object is not scattered.

According to the present method, the candidate alert is converted to a discarded alert in response to the measure of disorder being above a disorder threshold. In other words, in case the measure of disorder of intensity, or temperature, in pixels pertaining to the area comprising the detected stationary foreground object is above the disorder threshold, the candidate alert may be converted to a discarded alert. The disorder threshold may be a predetermined disorder threshold or a dynamic disorder threshold.

An advantage of converting the candidate alert to a discarded alert in response to the measure of disorder being above a disorder threshold is that a stationary foreground object not in need of action of the operator may have been detected. A further advantage of converting the candidate alert to a discarded alert in response to the measure of disorder being above a disorder threshold may be that the operator is not alerted, and may therefore reduce the economic cost related to false alarms. A further advantage of converting the candidate alert to a discarded alert in response to the measure of disorder being above a disorder threshold may be that the operator is not distracted having to inspect alarms related to detected stationary foreground objects not needing any actions of the operator.

For example, in case the detected stationary foreground object is scattered snow that has fallen from a vehicle in a traffic tunnel, the intensity of the detected stationary foreground object may be lower than the background intensity. In this example, the background intensity may be related to the temperature inside the traffic tunnel and the intensity of the detected stationary foreground object may be related to the temperature of the detected stationary foreground object. Thus, the snow may have a lower temperature than the traffic tunnel. The snow is scattered after falling from the vehicle, and the pixels pertaining to the area comprising the detected stationary foreground object may have intensities related to the background intensity and the intensity of the detected stationary foreground object. In other words, the pixels pertaining to the area comprising the scattered snow may have intensities related to the snow and the traffic tunnel. The scattered snow may therefore have a measure of disorder in intensity in pixels that is higher than for a solid, continuous object, since an area comprising the solid, continuous object may comprise fewer pixels associated with the background intensity. Thus, in the example of the detected stationary foreground object being scattered snow, the candidate alert is converted to a discarded alert, and is therefore not transmitted or relayed to an operator.

Therefore, an advantage of the present method may be that candidate alerts relating to snow falling from a vehicle in a traffic tunnel may be converted to discarded alerts, and may therefore reduce a number of false alarms and/or costs related to false alarms.

The method may further comprise: in response to the measure of disorder being equal to or below the disorder threshold, converting the candidate alert to an actual alert. In other words, in case the measure of disorder of intensity, or temperature, in pixels pertaining to the area comprising the detected stationary foreground object is below the disorder threshold, the candidate alert may be converted to an actual alert.

For example, in case the detected stationary foreground object is the solid, continuous object exemplified previously, the measure of disorder may be equal to or below the disorder threshold. In such case, the candidate alert is converted to an actual alert. An example of such a solid, continuous object may be a block of ice that did not break and scatter when falling from a vehicle.

An advantage of converting the candidate alert to an actual alert in response to the measure of disorder being equal to or below the disorder threshold is that solid, continuous objects having intensities below the background intensity may be distinguished from scattered objects having intensities below the background intensity. In other words, broken objects with pieces being dispersed/scattered having an intensity below the background intensity may be distinguished from a whole or unbroken object having an intensity below the background intensity.

The background intensity may be based on one or more of: an intensity in a portion of at least one thermal image in the stream of thermal images; an intensity in a portion of a reference thermal image; and a predetermined intensity.

The background intensity may be dynamically updated. The background intensity may be regularly updated. For instance, the background intensity may be updated every five minutes. It is to be understood that a thermal image may be divided in several portions, and that each portion may have a background intensity. In other words, different portions in a thermal image may have different background intensities.

According to the present method, the background intensity may be based on an intensity in a portion of at least one thermal image in the stream of thermal images. The background intensity may be a weighted average and/or weighted median of intensities of pixels in the portion of the at least one thermal image in the stream of thermal images. In case the background intensity is based on more than one thermal image in the stream of thermal images, the background intensity may be based on a weighted average of said more than one thermal image. For example, a resulting averaged thermal image may be created as a weighted average of the more than one thermal image. An image weight in the weighted average of the more than one thermal image may be based on an age of each thermal image, such that older thermal images contribute less to the weighted average than more recent thermal images. In other words, the background intensity may be based on an intensity in a portion of the resulting averaged thermal image.

According to the present method, the background intensity may be based on an intensity in a portion of a reference thermal image.

The background intensity may be a weighted average and/or weighted median of intensities of pixels in the portion of the reference thermal image. The reference thermal image may be a previous thermal image in the stream of thermal images. The reference thermal image may be based on more than one thermal image in the stream of thermal images. For example, the reference thermal image may be a weighted average of more than one thermal image in the stream of thermal images. The weighted average of more than one thermal image may be created such that each pixel in the reference thermal image is a weighted average of the corresponding pixels in said more than one thermal image. An image weight in the weighted average of said more than one thermal image may be based on an age of each thermal image, such that older thermal images contribute less to the weighted average than more recent thermal images.

According to the present method, the background intensity may be based on a predetermined intensity.

The predetermined intensity may be a minimum threshold intensity. The predetermined intensity may be a maximum threshold intensity. The predetermined intensity may be a fall back intensity.

It is to be understood that the background intensity may be based on a combination of an intensity in a portion of at least one thermal image in the stream of thermal images, an intensity in a portion of a reference thermal image, and/or a predetermined intensity. For instance, in case a background intensity based on an intensity in a portion of at least one thermal image in the stream of thermal images and/or an intensity in a portion of a reference thermal image results in a background intensity lower than the predetermined intensity, the background intensity may be set to the predetermined intensity. In other words, the predetermined intensity is a minimum threshold intensity below which the background intensity may not be set. It is to be understood that the predetermined intensity may be a maximum threshold intensity in a corresponding manner. Further, the predetermined intensity may be a fall back intensity in case it is not possible to base the background intensity on an intensity in a portion of at least one thermal image in the stream of thermal images and/or an intensity in a portion of a reference thermal image.

The measure of disorder may be based on one or more of: a variation in intensity of the detected stationary foreground object; a number of edges in the detected stationary foreground object; and strengths of edges in the detected stationary foreground object. The variation in intensity of the detected stationary foreground object may be based on intensity entropy, noise in intensity, and/or intensity gradients. For instance, the variation in intensity in pixels pertaining to an area comprising the detected stationary foreground object may be based on the entropy in intensity in pixels pertaining to the area comprising the detected stationary foreground object. The number and/or strengths of edges in the detected stationary foreground object may be features extracted from at least one thermal image in the stream of thermal images. The measure of disorder may therefore be based on the number and/or strengths of edges in the detected stationary foreground object.

The disorder threshold may be based on one or more of: a measure of disorder in a portion of at least one thermal image in the stream of thermal images; a measure of disorder in a portion of a reference thermal image; and a predetermined measure of disorder. The disorder threshold may be based on the measure of disorder in a portion of a previous thermal image in the stream of thermal images. The disorder threshold may be based on a weighted average and/or weighted median of measures of disorder in portions of previous thermal images in the stream of thermal images. For instance, an image weight in the weighted average and/or weighted median may be based on an age of the thermal image, such that older thermal images are less important in the weighted average and/or weighted median than newer thermal images. The disorder threshold may be regularly updated. The disorder threshold may be dynamically updated. For instance, the disorder threshold may be updated every five minutes. It is to be understood that a thermal image may be divided in several portions, and that each portion may have a disorder threshold. In other words, different portions in a thermal image may have different disorder thresholds.

It is to be understood that a reference thermal image, a weighted average and/or weighted median of more than one thermal image may in this context be determined in the same manner as described previously.

The act of detecting, in the stream of thermal images of the scene, a stationary foreground object may comprise: detecting, in the stream of thermal images of the scene, a foreground object in the scene; determining, for a sequence of thermal images in the stream of thermal images, a position in the scene of the detected foreground object; in response to the position in the scene of the detected foreground object being constant for the sequence of thermal images in the stream of thermal images, classifying the detected foreground object as a stationary foreground object. In other words, the position in the scene of the detected foreground object may be determined for a sequence of thermal images in the stream of thermal images, and in case the position is constant, the detected foreground object is classified as being stationary.

The wording "sequence of thermal images in the stream of thermal images" should be construed as more than one thermal image in the stream of thermal images.

The foreground object may be detected based on a comparison of a thermal image in the stream of thermal images with a reference thermal image and/or a previous thermal image in the stream of thermal images.

The sequence of thermal images in the stream of thermal images may be a sequence of subsequent thermal images. The sequence of thermal images in the stream of thermal images may be a sequence of consecutive thermal images. In other words, the sequence of thermal images may be consecutive, but may alternatively be nonconsecutive.

The position of the detected foreground object may be based on an area comprising the detected foreground object in each thermal image in the sequence of thermal images. For instance, the position may be a centroid or a weighted centroid of the area comprising the detected foreground object. The weight of the weighted centroid may be based on intensities of pixels associated with the area comprising the detected foreground object.

In case the position of the detected foreground object is not constant, the detected foreground object may be classified as a non-stationary foreground object. It is to be understood that the position may be constant within a predetermined range. In other words, the position of the foreground object may change within the predetermined range, and still be classified as a stationary foreground object.

An advantage of determining the position of the detected foreground object for a sequence of thermal images in the stream of thermal images is that moving foreground objects may be disregarded. For example, a car moving through the scene without stopping should not trigger a candidate alert.

The act of detecting, in the stream of thermal images of the scene, a foreground object may comprise: detecting, in the stream of thermal images of the scene, a change in the scene; determining a source of the change in the scene; and in response to the source of the change in the scene being a foreground object, classifying the source of the change in the scene as a detected foreground object.

The change in the scene may be related to a motion in the scene. The change in the scene may be related to an object appearing in the scene. For instance, it may be related to a car entering the scene or an object falling from a vehicle.

The source of the change in the scene may be an object related to the motion in the scene. For instance, it may be a car entering the scene or an object falling from a vehicle.

The source of the change may be determined as either being a foreground object or not. The determination may be based on a size of the source of the change. The determination may be based on a comparison of the size of the source of the change and a threshold size. For instance, in case the source of the change is a car, its size may be larger than a threshold size, and the source of the change may then be determined as being a foreground object. As a further example, in case the source of the change is a bird, its size may be smaller than a threshold size, and the source of the change may then be determined as not being a foreground object.

In case the change in the scene is related to a motion in the scene, the determination may be based on a speed of the motion in the scene. For instance, the speed of the motion may be compared to a threshold speed.

An advantage of determining the source of the change in the scene is that additional features of the source of the change may be used in the classification of foreground objects. For instance, the size and the speed of a source, for example, a car, may be used when classifying foreground objects.

According to a second aspect an alert discriminator configured to convert alerts in a video monitoring operation is provided. The device having a control circuitry comprising: an object-detection function configured to, in a stream of thermal images of a scene, detect a stationary foreground object in the scene, and in response thereto trigger a candidate alert; a candidate alert evaluation function configured to: evaluate an intensity of the detected stationary foreground object in relation to a background intensity; and in response to the intensity of the detected object being above the background intensity, convert the candidate alert to an actual alert.

The alert discriminator may be further configured to receive the stream of thermal images of the scene. The alert discriminator may be further configured to capture the stream of thermal images of the scene. In other words, the alert discriminator may be connected to or comprised in a thermal video camera. The alert discriminator may be connected, directly or indirectly, to a thermal video camera via a wired or wireless connection. The alert discriminator may further be configured to receive the stream of thermal images from a computer-readable medium on which the stream of thermal images is stored.

The object-detection function may be software or hardware implemented. The candidate alert evaluation function may be software or hardware implemented.

The alert discriminator may be further configured to transmit or relay the actual alert to an operator.

The above mentioned features and advantages of the previously described method, when applicable, apply to this second aspect as well. In order to avoid undue repetition, reference is made to the above.

The candidate alert evaluation function may be further configured to, in response to the intensity of the detected stationary foreground object being equal to or lower than the background intensity, calculate a measure of disorder in intensity in pixels pertaining to an area of the scene comprising the detected stationary foreground object; and in response to the measure of disorder being above a disorder threshold, convert the candidate alert to a discarded alert.

The candidate alert evaluation function may calculate the measure of disorder in intensity in pixels pertaining to an area of the scene in the manner as described previously.

The candidate alert evaluation function may be further configured to, in response to the measure of disorder being equal to or below the disorder threshold, convert the candidate alert to an actual alert.

The object-detection function may be configured to, in a stream of thermal images of a scene, detect a stationary foreground object in the scene, by being configured to: detect a foreground object in the scene; determine, for a sequence of thermal images in the stream of thermal images, a position of the detected foreground object; and in response to the position of the detected foreground object being constant for the sequence of thermal images in the stream of thermal images, classify the foreground object as a stationary foreground object.

The object-detection function may be configured to detect a foreground object in the scene by being further configured to: detect a change in the scene; determine a source of the change in the scene; and in response to the source of the change in the scene being a foreground object, classify the source of the change in the scene as a detected foreground object.

The alert discriminator may be comprised in a thermal video camera configured to acquire the stream of thermal images of the scene.

According to a third aspect a non-transitory computer readable storage medium having stored thereon instructions for implementing the present method, when executed on a device having processing capabilities is provided.

The above mentioned features of the method, when applicable, apply to this third aspect as well. In order to avoid undue repetition, reference is made to the above.

A further scope of applicability of the present disclosure will become apparent from the detailed description given below. However, it should be understood that the detailed description and specific examples, while indicating variants of the present teachings, are given by way of illustration only, since various changes and modifications within the scope of the present teachings will become apparent to those skilled in the art from this detailed description.

Hence, it is to be understood that the present teachings are not limited to the particular steps of the methods described or component parts of the systems described as such method and system may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present teachings will now be described in more detail, with reference to appended drawings showing variants of the present teachings. The figures should not be considered limiting the present teachings to the specific variant; instead, they are used for explaining and understanding the present teachings.

As illustrated in the figures, the sizes of layers and regions are exaggerated for illustrative purposes and, thus, are provided to illustrate the general structures of embodiments of the present teachings. Like reference numerals refer to like elements throughout.

DETAILED DESCRIPTION

The present teachings will now be described more fully hereinafter with reference to the accompanying drawings, in which variants of the present teachings are shown. The present teachings may, however, be implemented in many different forms and should not be construed as limited to the variants set forth herein; rather, these variants are provided for thoroughness and completeness, and fully convey the scope of the present teachings to the skilled person.

The present method will now be exemplified in a video monitoring operation with reference to FIGS. 1A-1D. A skilled person realizes that an intensity of an object in a thermal image may be related to a temperature of the object.

Figure 1A:
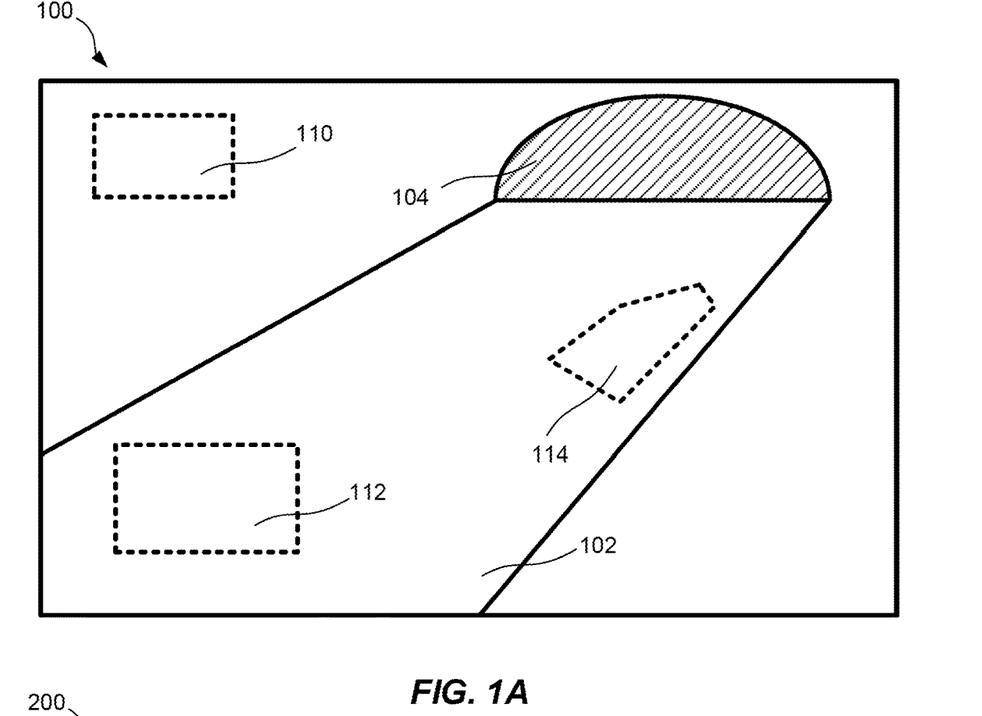
FIG. 1A illustrates a reference thermal image depicting a scene.

FIG. 1A illustrates a reference thermal image 100 depicting a scene.

In the examples shown in FIGS. 1A-1D, the scene is a traffic tunnel. In FIG. 1A, the traffic tunnel is empty, and in FIGS. 1B-1D different stationary foreground objects 220, 320, 420 are present. A method of detecting the different stationary foreground objects 220, 320, 420 will be described in relation to FIG. 4.

In the example shown in FIG. 1A, a road 102 and an entrance 104 to the traffic tunnel is seen. The reference thermal image 100 shown in FIG. 1A is a based on more than one thermal image in a stream of thermal images, but it may alternatively be a single thermal image in the stream of thermal images. The reference thermal image 100 in this example is a weighted average of several thermal images in the stream of thermal images. In this case, an image weight for older thermal images in the weighted average is less than the image weight for more recent thermal images in the weighted average. In other words, older thermal images contribute less to the weighted average than more recent thermal images do. The reference thermal image 100 is updated regularly in this example. For example, a new thermal image in the stream of thermal images is added to the weighted average every five minutes. It is to be understood that the new thermal image in the stream may be evaluated prior to adding it to the weighted average. For instance, depending on an intensity difference between the reference thermal image 100 and the new thermal image, the new thermal image may be included or excluded from the weighted average. The reference thermal image 100 may alternatively be updated dynamically. For instance, the reference thermal image 100 may be updated depending on an age of the reference thermal image 100, and/or intensities in thermal images in the stream of thermal images.

In the reference thermal image 100, several portions 110, 112, 114 is seen. A background intensity may be based on a first portion 110, a second portion 112, and a third portion 114. In this specific example, the background intensity is based on the first portion 110, but may equally be based on the second portion 112 or the third portion 114. The first portion 110, the second portion 112, and the third portion 114 may have different background intensities. Thus, different parts of the scene may be compared to different background intensities, which are based on different portions of the reference thermal image 100. In a traffic tunnel, as depicted in FIG. 1A, the background intensity is typically uniform. In other words, the background intensities in the first portion 110, the second portion 112, and the third portion 114 are typically uniform.

It is to be understood that the background intensity may be based on more than one portion, such as a combination of the first portion 110, the second portion 112, and/or the third portion 114.

In the example shown in FIG. 1A, the background intensity is updated regularly since the reference thermal image 100 is updated regularly. The background intensity may alternatively be updated dynamically.

In this example, the background intensity is a median of the intensity values of pixels in the first portion 110. Thus, the background is a weighted median, where a portion weight is equal for all pixels associated with the first portion 110. Alternatively, the background intensity may be a weighted average. It is to be understood that the background intensity may be a weighted average or median of intensities of pixels in the first portion 110, the second portion 112, and the third portion 114, where different weights are given to each respective portion 110, 112, 114.

It is to be understood that the above description is applicable in case the background intensity is based on at least one image in the stream of thermal images. Further, the background intensity may be set at a predetermined intensity.

As an alternative, the background intensity may be based on a combination of the above description. For example, the predetermined intensity may be a lower threshold, below which the background intensity may not be set. Thus, the background intensity may be based on the reference thermal image 100, and if the background intensity is to be set to an intensity value lower than the predetermined intensity, the background intensity is instead set to the predetermined intensity.

Figure 1B:
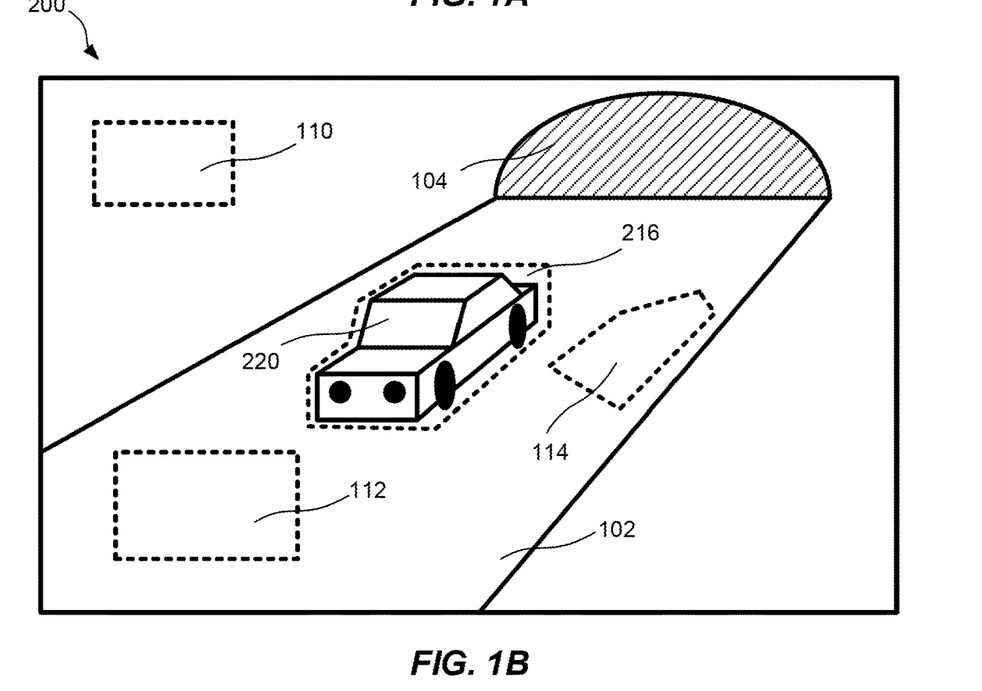
FIG. 1B illustrates a thermal image depicting a scene comprising a stationary car.

FIG. 1B illustrates a thermal image 200 depicting the traffic tunnel comprising a stationary car 220 that has recently entered the scene. Thus, within the context of this application, the stationary car 220 is a stationary foreground object. In this example, the stationary car 220 is detected using an object-detection function, which is software implemented. However, the object-detection function may be hardware implemented. Upon detecting the stationary car 220, a candidate alert is triggered.

In the example shown in FIG. 1B, a first area 216 comprising the stationary car 220 is visualized. The first area 216 may be determined by the object-detection function. After the stationary car 220 has been detected, an intensity of the stationary car 220 is evaluated in relation to the background intensity. The intensity of the stationary car 220 is, in this example, a median of the intensities of pixels pertaining to the first area 216. In other words, the intensity of the stationary car 220 is a weighted median in which the pixel weight is 1 for all pixels. However, the intensity of the stationary car 220 may be determined in a number of different ways. For example, it may be a peak intensity of the pixels pertaining to the first area 216, or as a weighted average of intensities of the pixels pertaining to the first area 216. The intensity of the stationary car 220 in the example shown in FIG. 1B, is found to be higher than the background intensity.

Since the intensity of the stationary car 220 is found to be higher than the background intensity, the candidate alert is converted to an actual alert. The actual alert may then be transmitted or relayed to an operator. The operator may be a person in the video monitoring operation.

Figure 1C:
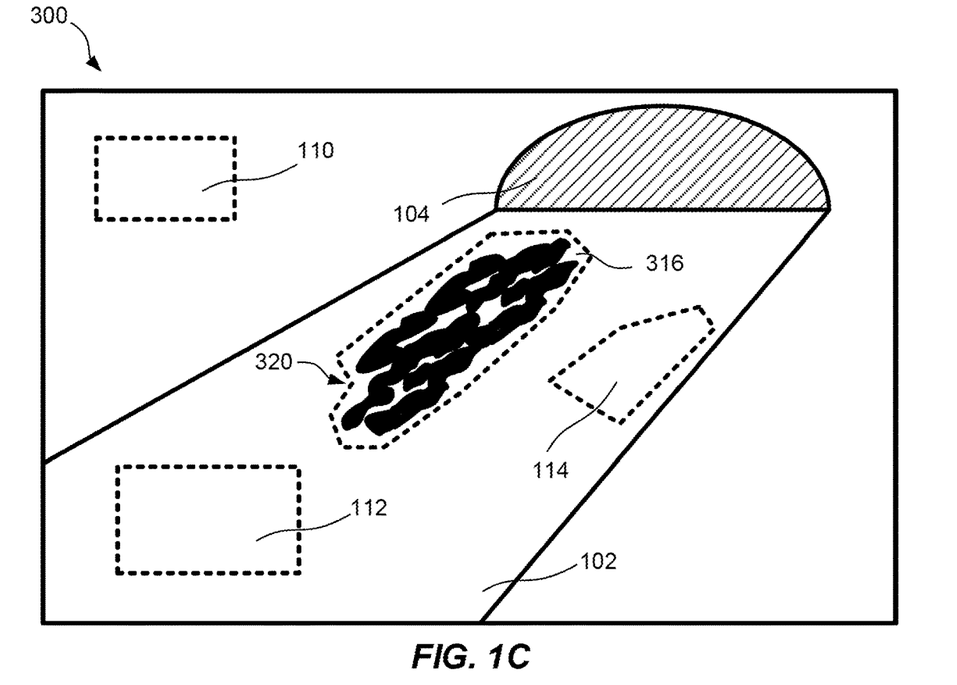
FIG. 1C illustrates a thermal image depicting a scene comprising scattered snow.

FIG. 1C illustrates a thermal image 300 depicting a traffic tunnel comprising scattered snow 320 that has recently entered the scene. Thus, within the context of this application the scattered snow 320 is a stationary foreground object. Similar to the description in relation to FIG. 1B and the stationary car 220, the object-detection function detects the scattered snow 320 and a candidate alert is triggered. The object-detection function also identifies a second area 316 comprising the scattered snow 320. However, in the case shown in FIG. 1C, the intensity of the detected stationary foreground object, that is, the scattered snow 320, is lower than the background intensity. In this case, a measure of disorder in intensity in pixels pertaining to the second area 316 is calculated. The measure of disorder may be based on one or more of a variation in intensity in the second area 316, a number of edges in the second area 316, and strengths of the edges in the second area 316. In the specific example shown in FIG. 1C, the measure of disorder is based on a variation in intensity in pixels pertaining to the second area 316. More specifically, the measure of disorder is based on an entropy in intensity in pixels pertaining to the second area 316. Other examples of variations in intensity in pixels, upon which the measure of disorder may be based are noise in intensity and intensity gradients. The measure of disorder may, in other examples, be based on a number and/or strengths of edges in the second area 316. It is to be understood that the measure of disorder may be based on one or more of a variation in intensity in the second area 316, a number of edges in the second area 316, and strengths of edges in the second area 316.

As is seen in FIG. 1C, the second area 316 comprises both the scattered snow 320 and part of the road 102. Therefore, the intensities in pixels pertaining to the second area 316 are related to both the detected stationary foreground object, that is, the scattered snow 320, and the background intensity, that is, the road 102. Thus, the variation in intensity in pixels pertaining to the second area 316 relates to a difference in intensity between the scattered snow 320 and the background intensity, as well as the number of pixels associated with the scattered snow 320 and the background intensity in the second area 316. In the example shown in FIG. 1C, the measure of disorder is found to be above a disorder threshold. The disorder threshold for the example described here is based on a measure of disorder in the first portion 110 of the reference thermal image 100 shown in FIG. 1A. In a different example, the disorder threshold may be an average of the measure of disorder in more than one portion, such as the second portion 112 and the third portion 114 in the reference thermal image 100. Other examples of disorder thresholds are a measure of disorder in a portion of at least one thermal image in the stream of thermal images and a predetermined measure of disorder. It is to be understood that the disorder threshold may be based on one or more of a measure of disorder in a portion of at least one thermal image in the stream of thermal images, a measure of disorder in a portion of the reference thermal image 100, and a predetermined disorder threshold. For instance, the predetermined disorder threshold may be a lower/upper disorder threshold below/above which the disorder threshold may not be set. In other words, in case the disorder threshold is dynamically updated to a too low/high value, the predetermined disorder threshold may be used instead. Also, in case a disorder threshold cannot be determined from, for example, a portion 110, 112, 114 in the reference thermal image 100, the predetermined threshold may be used as a disorder threshold.

Thus, the candidate alert triggered for the scattered snow 320 is converted to a discarded alert. Thus, the discarded alert is not transmitted or relayed to the operator, and the operator, in turn, does not need to investigate an alarm relating to the scattered snow 320.

Figure 1D:
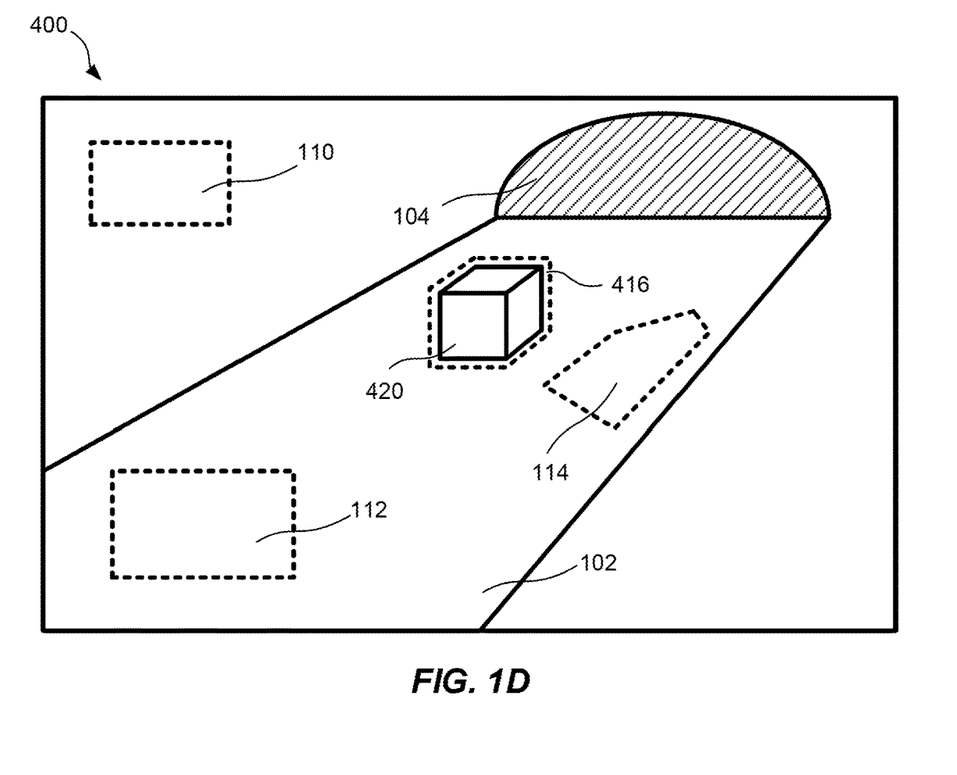
FIG. 1D illustrates a thermal image depicting a scene comprising a solid, continuous block of ice.

FIG. 1D illustrates a thermal image 400 depicting a traffic tunnel comprising a solid, continuous block of ice 420 that has recently entered the scene. Thus, within the context of this application the solid, continuous block of ice 420 is a stationary foreground object. Similar to the description in relation to FIG. 1B and FIG. 1C, the object-detection function detects the solid, continuous block of ice 420 and a candidate alert is triggered. The object-detection function also identifies a third area 416 comprising the solid, continuous block of ice 420. Similar to the example shown in FIG. 1C, the intensity of the detected stationary foreground object, that is, the solid, continuous block of ice 420, is lower than the background intensity, and a measure of disorder in intensity in pixels pertaining to the third area 416 is calculated in a corresponding manner as described in relation to the second area 316 in FIG. 1C. As is seen in FIG. 1D, the third area 416 comprises the solid, continuous block of ice 420 and part of the road 102. Compared to the second area 316 in FIG. 1C, the number of pixels associated with the road 102 relative to the detected stationary foreground object in the third area 416 in FIG. 1D is smaller. In other words, the number of pixels associated with the road 102 in the second area 316 relative to the number of pixels associated with the scattered snow 320 in the second area 316 is higher than the number of pixels associated with the road 102 in the third area 416 relative to the number of pixels associated with the solid, continuous block of ice 420 in the third area 416. Thus, in case pixels associated with the scattered snow 320 and pixels associated with the solid, continuous block of ice 420 have similar intensities, the measure of disorder of the second area 316 is higher than the measure of disorder of the third area 416.

In the example shown in FIG. 1D, the measure of disorder is below the threshold intensity, and the candidate alert is converted to an actual alert. Therefore, the operator is alerted to the presence of the solid, continuous block of ice 420 in the scene depicted in the thermal image 400.

Figure 2:
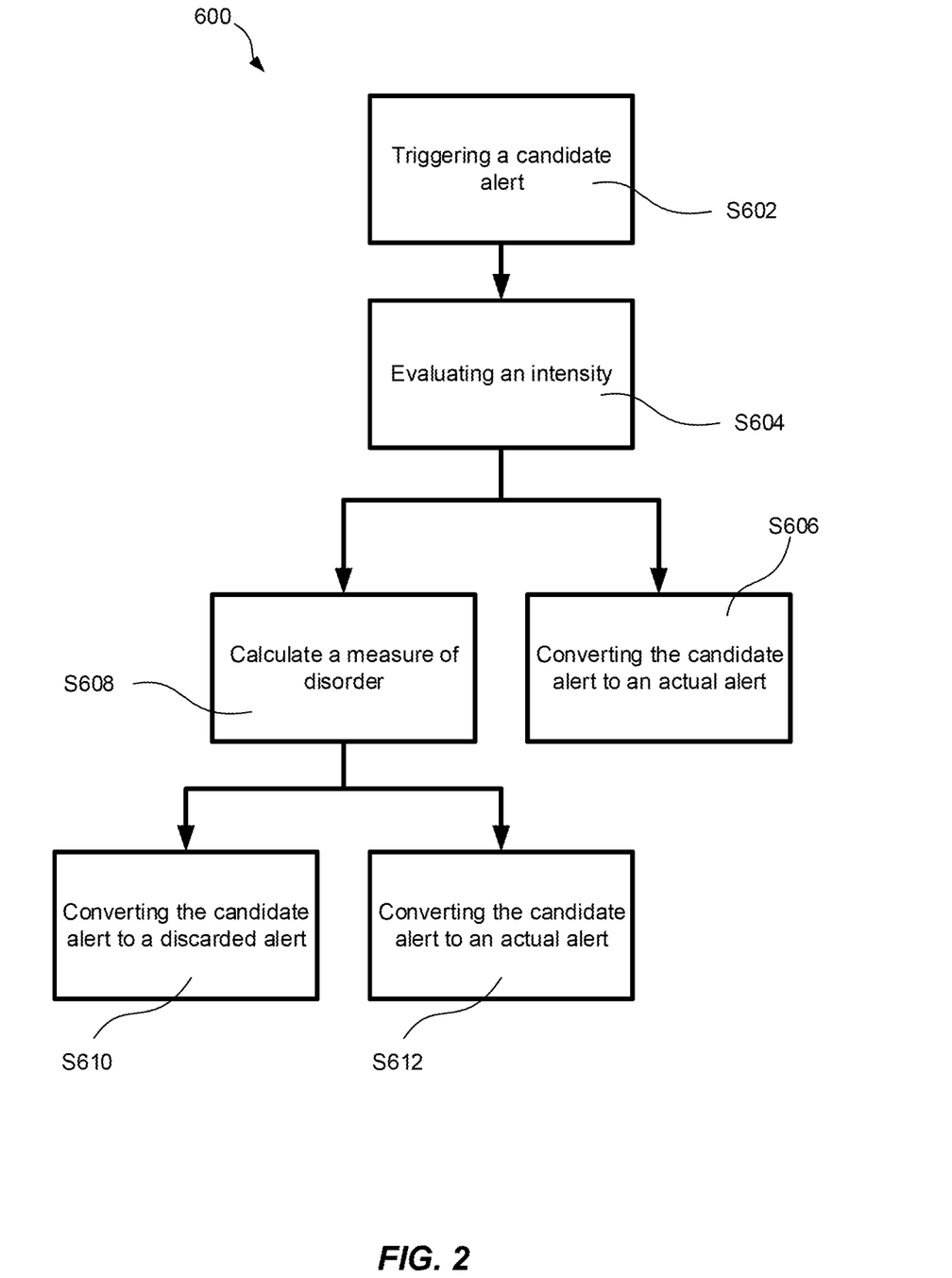
FIG. 2 is a block scheme of a method for converting a candidate alert.

A method 600 for converting a candidate alert will now be described with further reference to FIG. 2.

The method 600 comprises triggering S602 a candidate alert in response to detecting, in a stream of thermal images of a scene, a stationary foreground object 220, 320, 420 in the scene. Similar to as described in relation to FIGS. 1B-1C, the stationary foreground object 220, 320, 420 is detected using a software implemented object-detection function, but it may be hardware implemented. It is to be understood that the object-detection function may be a combination of software and hardware implementations. The stationary foreground object 220, 320, 420 may, for example, be the stationary car 220 in FIG. 1B, the scattered snow 320 in FIG. 1C, or the solid, continuous block of ice 420 in FIG. 1D.

The method 600 further comprises evaluating S604 an intensity of the detected stationary foreground object 220, 320, 420 in relation to a background intensity. The background intensity may be determined and updated in similar manners as described in relation to FIG. 1A.

In case the intensity of the detected stationary foreground object 220, 320, 420 is above the background intensity, such as for the stationary car 220 in FIG. 1B, the method 600 further comprises converting S606 the candidate alert to an actual alert.

In case the intensity of the detected stationary foreground object 220, 320, 420 is below the background intensity, such as for the scattered snow 320 in FIG. 1C and the solid, continuous block of ice 420 in FIG. 1D, the method 600 further comprises calculating S608 a measure of disorder in intensity in pixels pertaining to an area 216, 316, 416 of the scene comprising the detected stationary foreground object 220, 320, 420. The measure of disorder and the disorder threshold may be determined in similar manners as described in relation to FIG. 1C.

In case the measure of disorder in intensity in pixels pertaining to the area 216, 316, 416 of the scene comprising the detected stationary foreground object 220, 320, 420 is above a disorder threshold, such as for the scattered snow 320 in FIG. 1C, the method 600 further comprises converting S610 the candidate alert to a discarded alert.

In case the measure of disorder in intensity in pixels pertaining to the area 216, 316, 416 of the scene comprising the detected stationary foreground object 220, 320, 420 is below a disorder threshold, such as for the solid, continuous block of ice 420, the method 600 further comprises converting S612 the candidate alert to an actual alert.

Figure 3:
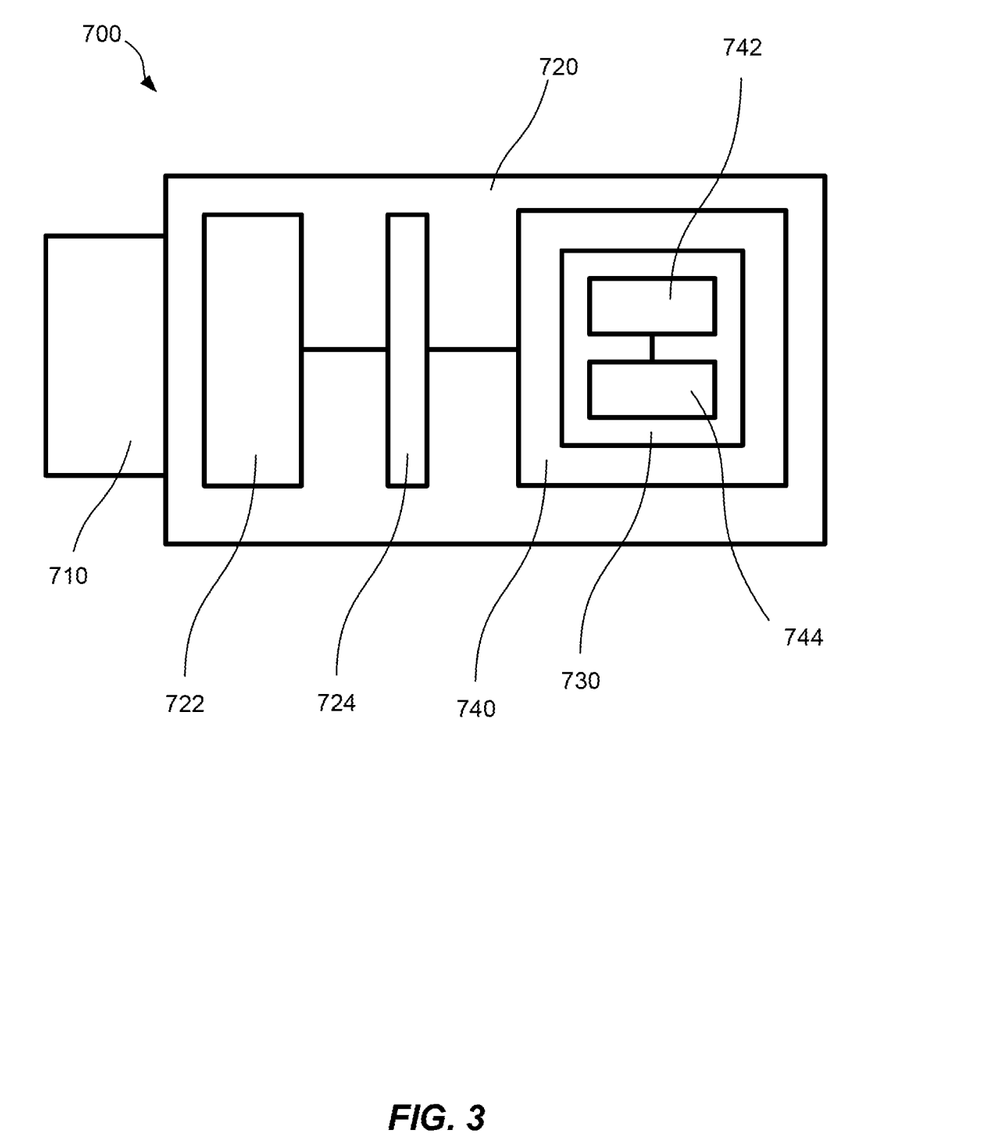
FIG. 3 illustrates a thermal video camera.

A thermal video camera 700 configured to acquire a stream of thermal images of a scene will now be described with further reference to FIG. 3. The scene may be the scene illustrated in any one of FIGS. 1A-1D. The thermal video camera 700 comprises a camera objective 710 and a camera casing 720. The camera objective 710 is configured to image the scene onto a thermal image sensor 722, and thereby acquire the stream of thermal images of the scene.

The thermal video camera 700 further comprises a data bus 724 and an alert discriminator 730. The thermal image sensor 722 and the alert discriminator 730 are arranged to communicate via the data bus 724. Thus, the stream of thermal images acquired by the thermal image sensor 722 is transmitted to the alert discriminator 730 via the data bus 724. The thermal video camera 700 may comprise additional components, such as dedicated hardware for video encoding and memory.

The alert discriminator 730 comprises a control circuit 740. The control circuit 740 comprises an object-detection function 742 and a candidate alert evaluation function 744.

The object-detection function 742 is configured to detect, in the stream of thermal images of a scene, a stationary foreground object 220, 320, 420 in the scene, and in response thereto trigger a candidate alert.

The object-detection function 742 in this example detects a stationary foreground object in the scene by being configured to detect a foreground object in the scene. A foreground object in the scene may be detected in a plurality of different manner. As an example of a detection of a foreground object in the scene, the object-detection function 742 is further configured to detect a change in the scene. The object-detection function 742 in this example is then further configured to determine a source of the change in the scene, and in response to the source of the change in the scene being a foreground object, classify the source of the change in the scene as a detected foreground object. The object-detection function 742, in this example, is configured to determine a position of the detected foreground object in a sequence of thermal images in the stream of thermal images. In response to the position of the detected foreground object being constant in the sequence of thermal images in the stream of thermal images, the object-detection function 742 is configured to classify the foreground object as a stationary foreground object 220, 320, 420.

The candidate alert is communicated to the candidate alert evaluation function 744.

The candidate alert evaluation function 744 is configured to evaluate an intensity of the detected stationary foreground object 220, 320, 420 in relation to a background intensity, and in response to the intensity of the detected stationary foreground object 220, 320, 420 being equal to or above the background intensity, such as for the stationary car 220 in FIG. 1B, convert the candidate alert to an actual alert. The background intensity may be determined and updated in similar manners as described in relation to FIG. 1A.

The candidate alert evaluation function 744 in this specific example is further configured to, in response to the intensity of the detected stationary foreground object 220, 320, 420 being equal to or lower than the background intensity, calculate a measure of disorder in intensity in pixels pertaining to an area 216, 316, 416 of the scene comprising the detected stationary foreground object 220, 320, 420. The measure of disorder may be determined in a similar manner as described in relation to FIG. 1C.

In case the measure of disorder is above a disorder threshold, as is the case if the thermal video camera 700 monitors the scene comprising the scattered snow 320 illustrated in FIG. 1C, the candidate alert evaluation function 744 in this example is further configured to convert the candidate alert to a discarded alert. The disorder threshold may be determined in a similar manner as described in relation to FIG. 1C.

In case the measure of disorder is below the disorder threshold, as is the case if the thermal video camera 700 monitors the scene comprising the solid, continuous block of ice 420 illustrated in FIG. 1D, the candidate alert evaluation function 744 in this example is further configured to convert the candidate alert to an actual alert.

Figure 4:
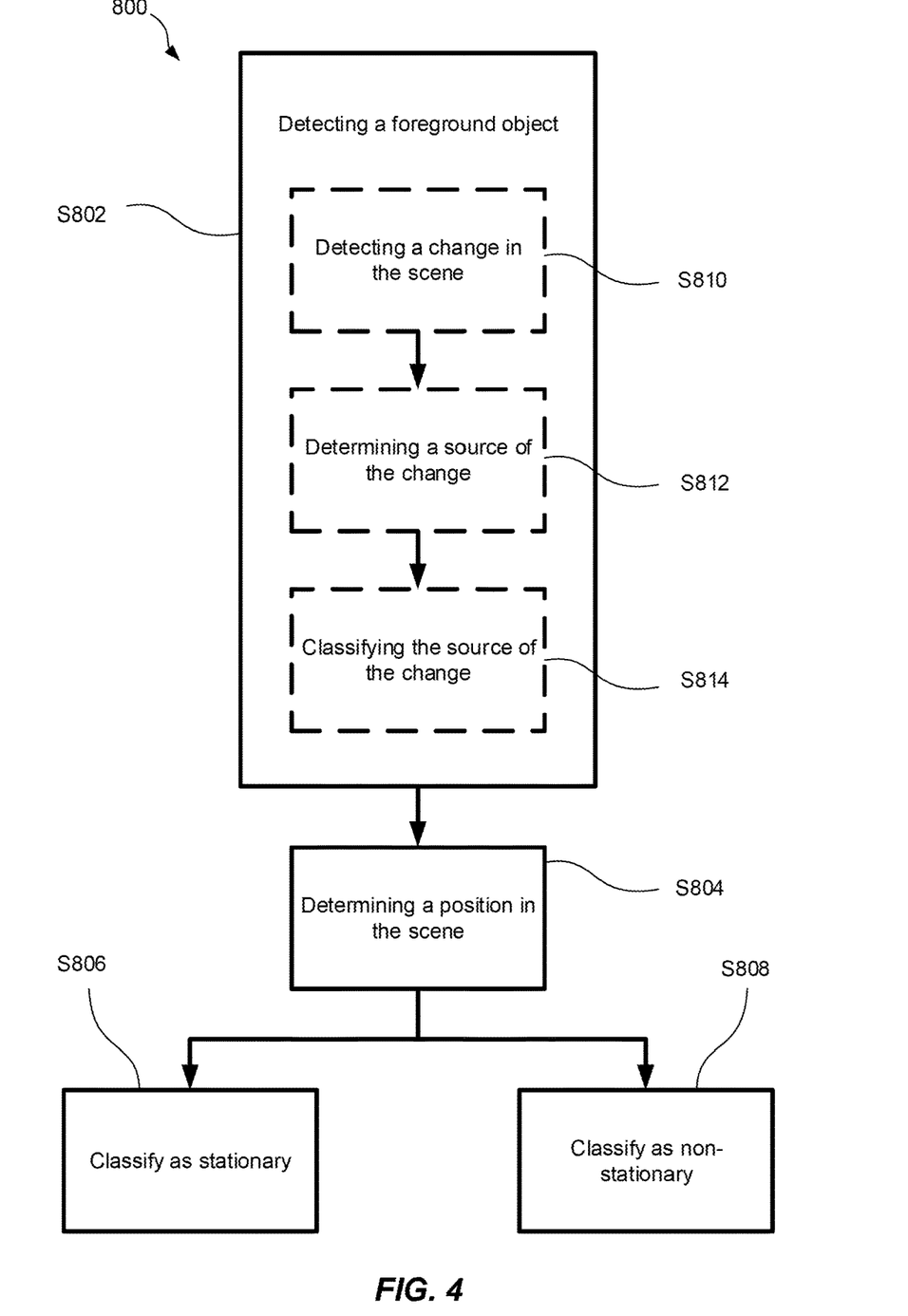
FIG. 4 is a block scheme of a method for detecting a stationary foreground object.

FIG. 4 is a block scheme of a method 800 for detecting a stationary foreground object 220, 320, 420. The method 800 comprises detecting S802, in a stream of thermal images, a foreground object in the scene. The foreground object may be detected in a plurality of different manner. In this specific example, the foreground object is detected by detecting S810, in the stream of thermal images of the scene, a change in the scene. The change in the scene may, for instance, be related to a motion in the scene or related to an object appearing in the scene.

The foreground object is further detected by determining S812 a source of the change in the scene. The source of the change in the scene may be an object related to the motion in the scene.

The foreground object is further detected by classifying S814 the source of the change. In case the source of the change is classified S814 as a foreground object, the method 800 has detected a foreground object. Alternatively, in case the source of the change is classified S814 not as a foreground object, the method 800 has not detected a foreground object.

In case a foreground object has been detected S802 in the scene, a position in the scene of the detected foreground object is determined S804 for a sequence of thermal images in the stream of thermal images. In other words, the position of the detected foreground object is tracked. In this specific example, the position of the detected foreground object is tracked in a sequence of consecutive thermal images in the stream of thermal images. The detected foreground object is then classified depending on a change of the position of the foreground object. In case the position is constant, the detected foreground object is classified S806 as a stationary foreground object 220, 320, 420. Alternatively, in case the position is not constant, the detected foreground object is classified S808 as a non-stationary foreground object.

As an example, detecting a foreground object in the thermal image 200 depicted in FIG. 1B may be done by detecting S810 a change in the scene as the car enters the traffic tunnel. The source of the change is then determined S812 as being the car. The source of the change, that is, the car in this example, is then classified S814. In this case, the size of the source of the change is compared to a threshold size, and the car is classified as a foreground object. Other classification S814 the source of the change may comprise different acts, such as evaluating, for example, a speed of the source of the change. The car 220 in FIG. 1B has stopped after entering the scene, why its position, in a sequence of thermal images in the stream of thermal images, is constant. The position in the scene of the car in FIG. 1B is, in this example, based on a weighted centroid of pixels associated with the area 216 comprising the stationary car 220. It is to be understood that there is a plurality of different ways to determine a position of a foreground object. The method 800 therefore classifies S806 the car as a stationary foreground object 220. In case the car did not stop, its position would not be constant, and the method 800 would therefore classify S808 the car as a non-stationary foreground object. It is to be understood that the method 800 may be applied to the thermal images 300, 400 displayed in FIG. 1C and FIG. 1D as well, and that the scattered snow 320 and the solid, continuous block of ice 420 would be detected and classified as stationary foreground objects 320, 420.

The person skilled in the art realizes that the present teachings by no means are limited to the variants described above. On the contrary, many modifications and variations are possible within the scope of the appended claims.

For instance, the reference thermal image may be a weighted median or a weighted sum of several thermal images in the stream of thermal images instead of a weighted average, as exemplified here.

For instance, the background intensity and/or the disorder threshold may be based on a portion in the reference thermal image corresponding to the portion comprising the detected stationary foreground object.

Additionally, variations to the disclosed variants can be understood and effected by the skilled person in practicing the present teachings, from a study of the drawings, the disclosure, and the appended claims.

What is claimed is:

1. A method for converting alerts in a video monitoring operation, the method comprising:
    triggering a candidate alert, in response to detecting, in a stream of thermal images of a scene, a stationary foreground object in the scene;
    evaluating an intensity of the detected stationary foreground object in relation to a background intensity; and
    in response to the intensity of the detected stationary foreground object being above the background intensity, converting the candidate alert to an actual alert;
    in response to the intensity of the detected stationary foreground object being equal to or lower than the background intensity, calculating a measure of disorder in intensity in pixels pertaining to an area of the scene comprising the detected stationary foreground object, the measure of disorder being indicative of the degree in which the detected stationary foreground object is scattered; and
    in response to the measure of disorder being above a disorder threshold, converting the candidate alert to a discarded alert.

2. The method according to claim 1, further comprising:
    in response to the measure of disorder being equal to or below the disorder threshold, converting the candidate alert to an actual alert.

3. The method according to claim 1, wherein the background intensity is based on one or more of:
    an intensity in a portion of at least one thermal image in the stream of thermal images;
    an intensity in a portion of a reference thermal image; and
    a predetermined intensity.

4. The method according to claim 1, wherein the measure of disorder is based on one or more of:
    a variation in intensity of the detected stationary foreground object;
    a number of edges in the detected stationary foreground object; and
    strengths of edges in the detected stationary foreground object.

5. The method according to claim 1, wherein the disorder threshold is based on one or more of:
    a measure of disorder in a portion of at least one thermal image in the stream of thermal images;
    a measure of disorder in a portion of a reference thermal image; and
    a predetermined measure of disorder.

6. The method according to claim 1, wherein the act of detecting, in the stream of thermal images of the scene, a stationary foreground object comprises:
    detecting, in the stream of thermal images of the scene, a foreground object in the scene;
    determining, for a sequence of thermal images in the stream of thermal images, a position in the scene of the detected foreground object; and in response to the position in the scene of the detected foreground object being constant for the sequence of thermal images in the stream of thermal images, classifying the detected foreground object as a stationary foreground object.

7. The method according to claim 6, wherein the act of detecting, in the stream of thermal images of the scene, a foreground object comprises:
  detecting, in the stream of thermal images of the scene, a change in the scene;
  determining a source of the change in the scene; and
  in response to the source of the change in the scene being a foreground object, classifying the source of the change in the scene as a detected foreground object.

8. A device configured to convert alerts in a video monitoring operation, the device having a control circuitry comprising:
  an object-detection function configured to, in a stream of thermal images of a scene, detect a stationary foreground object in the scene, and in response thereto trigger a candidate alert;
  a candidate alert evaluation function configured to:
    evaluate an intensity of the detected stationary foreground object in relation to a background intensity;
    in response to the intensity of the detected stationary foreground object being above the background intensity, convert the candidate alert to an actual alert;
    in response to the intensity of the detected stationary foreground object being equal to or lower than the background intensity, calculate a measure of disorder in intensity in pixels pertaining to an area of the scene comprising the detected stationary foreground object, the measure of disorder being indicative of the degree in which the detected stationary foreground object is scattered; and
    in response to the measure of disorder being above a disorder threshold, convert the candidate alert to a discarded alert.

9. The device according to claim 8, wherein the candidate alert evaluation function is further configured to, in response to the measure of disorder being equal to or below the disorder threshold, convert the candidate alert to an actual alert.

10. The device according to claim 8, wherein the object-detection function is configured to, in a stream of thermal images of a scene, detect a stationary foreground object in the scene, by being configured to:
  detect a foreground object in the scene;
  determine, for a sequence of thermal images in the stream of thermal images, a position of the detected foreground object; and
  in response to the position of the detected foreground object being constant for the sequence of thermal images in the stream of thermal images, classify the foreground object as a stationary foreground object.

11. The device according to claim 10, wherein the object-detection function is configured to detect a foreground object in the scene by being further configured to:
  detect a change in the scene;
  determine a source of the change in the scene; and
  in response to the source of the change in the scene being a foreground object, classify the source of the change in the scene as a detected foreground object.

12. The device according to claim 8, wherein the alert discriminator is comprised in a thermal video camera configured to acquire the stream of thermal images of the scene.

13. A non-transitory computer readable storage medium including instructions which, when executed on a device having a processing capability, cause the device to execute instructions for converting alerts in a video monitoring operation, the instructions causing the device to perform operations comprising:
  triggering a candidate alert, in response to detecting, in a stream of thermal images of a scene, a stationary foreground object in the scene;
  evaluating an intensity of the detected stationary foreground object in relation to a background intensity; and
  in response to the intensity of the detected stationary foreground object being above the background intensity, converting the candidate alert to an actual alert;
  in response to the intensity of the detected stationary foreground object being equal to or lower than the background intensity, calculating a measure of disorder in intensity in pixels pertaining to an area of the scene comprising the detected stationary foreground object, the measure of disorder being indicative of the degree in which the detected stationary foreground object is scattered; and
  in response to the measure of disorder being above a disorder threshold, converting the candidate alert to a discarded alert.

* * * * *